(12) United States Patent
Montanari et al.

(10) Patent No.: US 6,376,037 B1
(45) Date of Patent: Apr. 23, 2002

(54) POLYAMIDE-BASED THERMOPLASTIC COMPOSITIONS

(75) Inventors: Thibaut Montanari, Bernay; Jean-Marc Durand, Paris, both of (FR)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 09/535,738

(22) Filed: Mar. 27, 2000

(30) Foreign Application Priority Data

Mar. 26, 1999 (FR) .............................. 99 03814

(51) Int. Cl.[7] .............................. B29D 23/00
(52) U.S. Cl. ............ 428/36.9; 428/35.7; 428/36.8
(58) Field of Search ................. 525/432; 428/35.7, 428/36.8, 36.9

(56) References Cited

U.S. PATENT DOCUMENTS

| | | | | |
|---|---|---|---|---|
| 3,932,340 A | * | 1/1976 | Kamosaki et al. | |
| 4,334,056 A | * | 6/1982 | Meyer et al. | 528/496 |
| 4,866,115 A | | 9/1989 | Betz et al. | 524/135 |
| 5,250,604 A | | 10/1993 | Moriwaki et al. | 524/494 |
| 5,250,619 A | * | 10/1993 | Heinz et al. | 525/92 |
| 5,414,051 A | | 5/1995 | Mason et al. | 525/432 |
| 5,416,172 A | * | 5/1995 | Blondel et al. | 525/432 |
| 5,500,473 A | | 3/1996 | Wissmann | 524/447 |
| 5,789,529 A | | 8/1998 | Matsumura et al. | 528/310 |
| 6,156,869 A | * | 12/2000 | Tamura et al. | 528/310 |

* cited by examiner

*Primary Examiner*—Ana Woodward
(74) *Attorney, Agent, or Firm*—Millen, White, Zelano & Branigan, P.C.

(57) ABSTRACT

Polyamide-based thermoplastic compositions comprising by weight:
- 50 to 99% of a polyamide (A1),
- 1 to 50% of a catalyzed polyamide (A2),
- 0 to 40% of a plasticizer,
- 0 to 60%, preferably 0 to 30%, of a flexible modifier, the total being 100%, are useful for manufacturing articles, for example, flexible pipes.

18 Claims, 3 Drawing Sheets

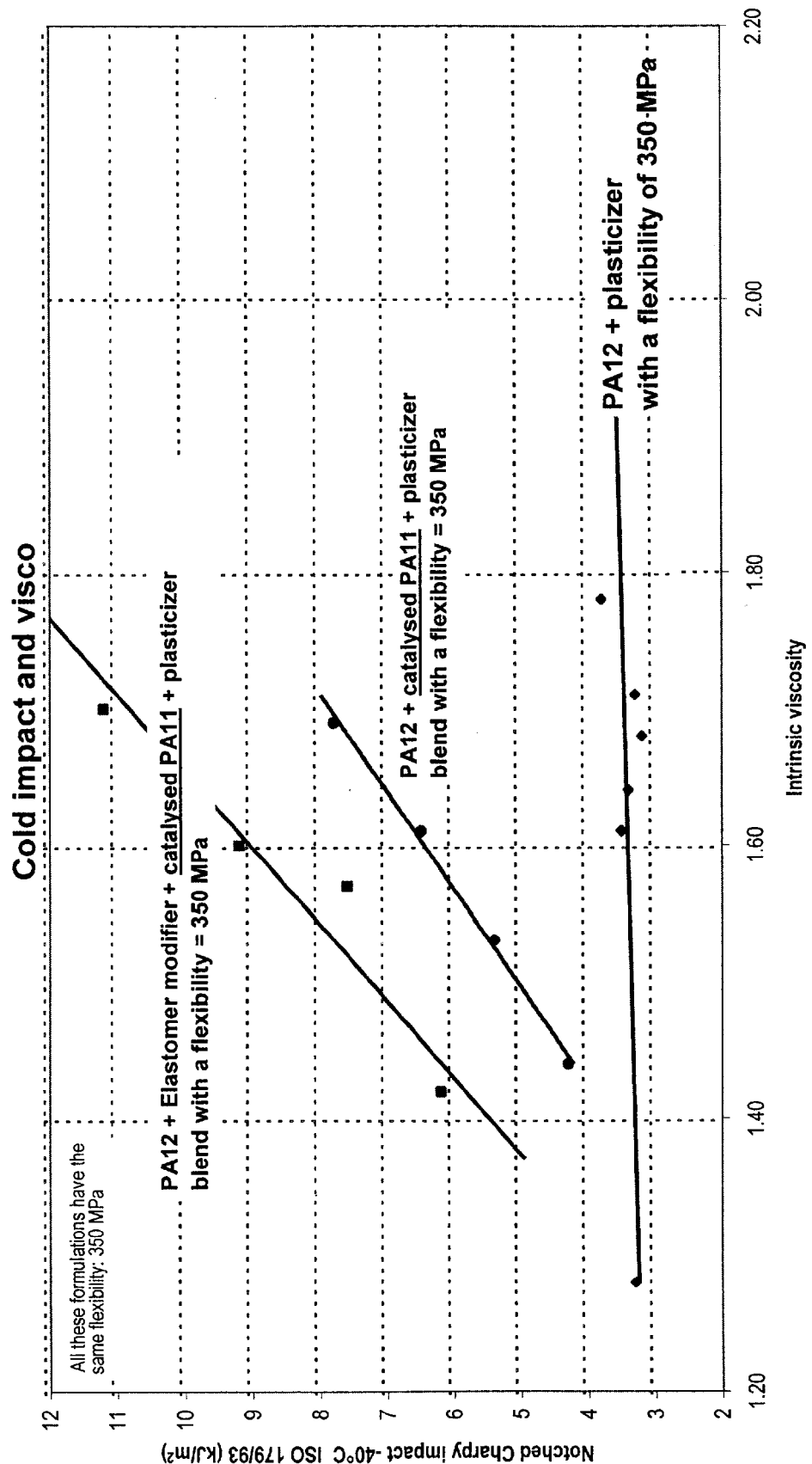
FIGURE 1/3

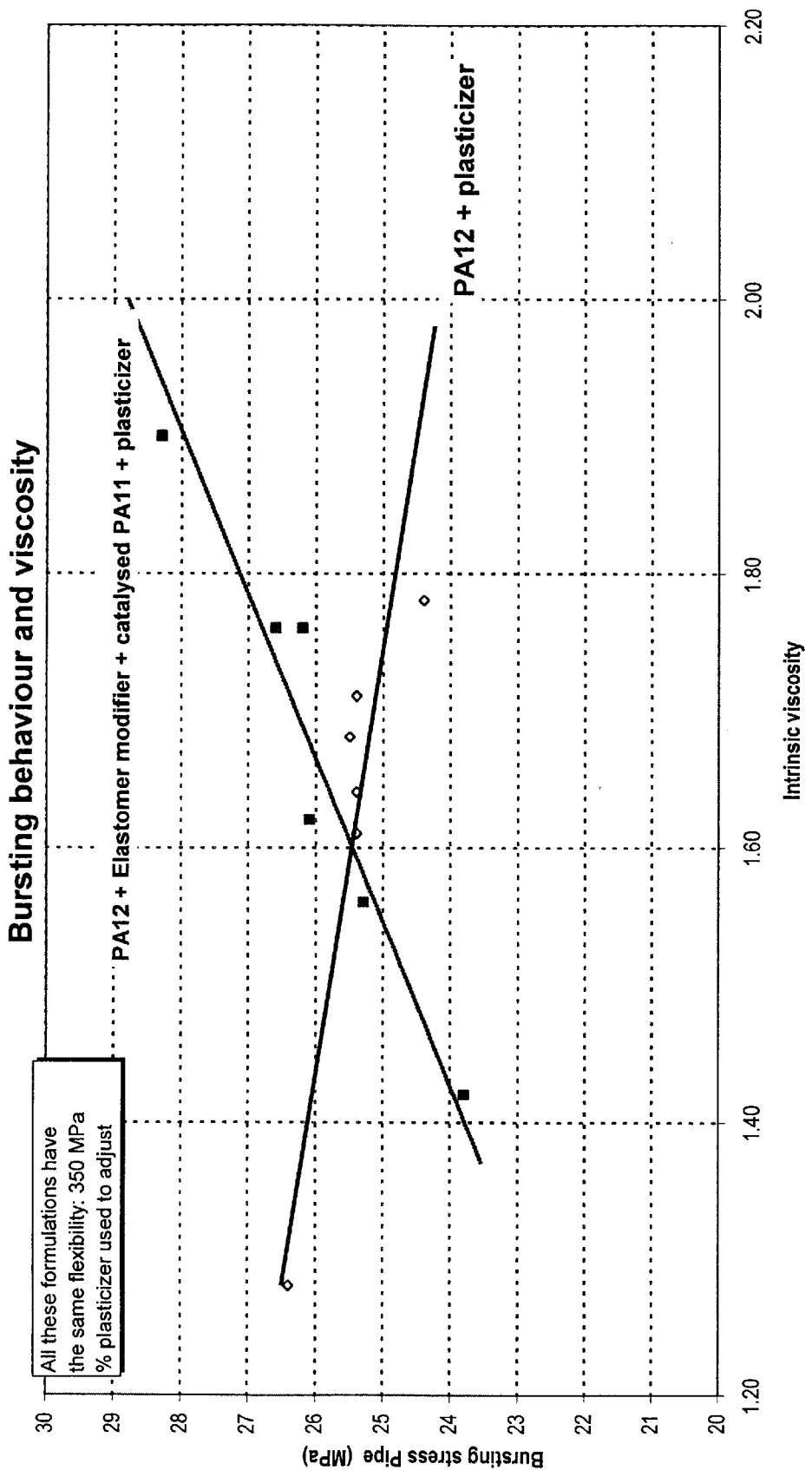
FIGURE 2/3

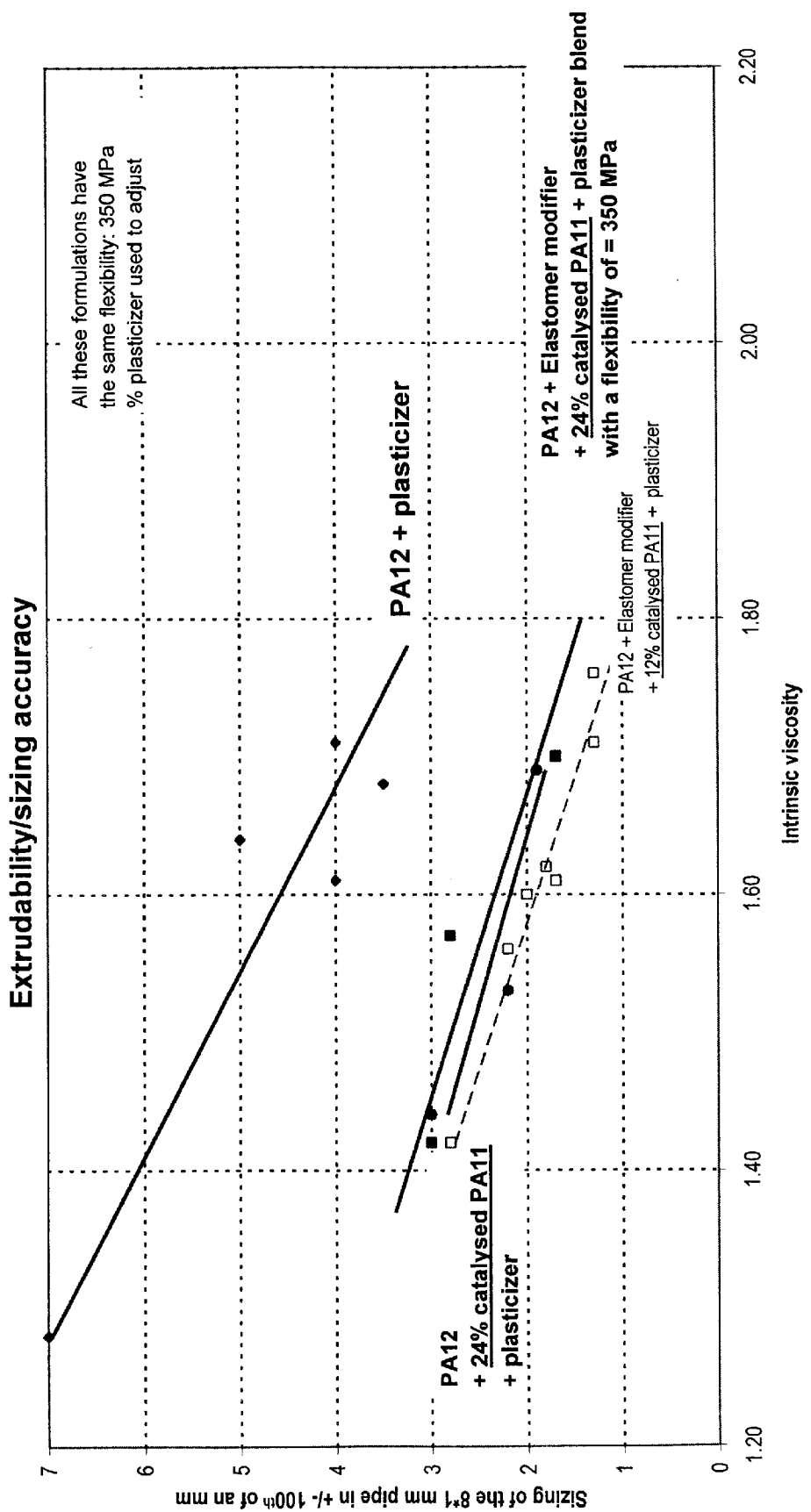
FIGURE 3/3

POLYAMIDE-BASED THERMOPLASTIC COMPOSITIONS

FIELD OF THE INVENTION

The present invention relates to polyamide-based thermoplastic compositions and more particularly to thermoplastic compositions comprising by weight:

50 to 99% of a polyamide (A1), 1 to 50% of a catalysed polyamide (A2), 0 to 40% of a plasticizer, 0 to 60%, preferably 0 à 30%, of a flexible modifier, the total being 100%.

These compositions are of use for the manufacture, for example, of flexible pipes.

BACKGROUND OF THE INVENTION

Polyamides have to be modified by incorporation of rubbers or other polymers, for example, in order to modify the flexural modulus thereof or to improve the impact strength thereof.

U.S. Pat. No. 5,070,145 discloses compositions composed of 80 parts of polyamide-6 or polyamide-6,6 in which has been dispersed 20 parts of a mixture (i) of a copolymer of ethylene and of an ethyl or butyl acrylate and (ii) of a copolymer of ethylene, of ethyl acrylate and of maleic anhydride. These compositions exhibit good impact strength.

EP 284,379 discloses multiphase compositions comprising ethylene copolymer and polyamide which are provided in the form of a polyamide matrix in which are dispersed nodules (1) of a copolymer of ethylene, of ethyl acrylate and of maleic anhydride, nodules of polyamide being dispersed in these nodules (1). The starting point is the preparation of these nodules (1) by dispersing polyamide in the ethylene copolymer; crosslinking is then carried out and these nodules are subsequently dispersed in polyamide. These compositions are also presented as having good impact strength.

FR 2,719,849 discloses thermoplastic compositions comprising a matrix of a thermoplastic polymer in which are dispersed nodules of a second thermoplastic polymer which is partially or completely encapsulated by an ethylene copolymer. These compositions are prepared by first encapsulating the second polymer, and subsequently the other polymer is added, forming the matrix, under conditions such that the capsules are not destroyed. This preparation is carried out in two completely separate stages or one following the other in the same extruder. These compositions exhibit both good flexibility and good impact strength. The examples show polyamide-6, polyamide-12 or PBT (polybutylene terephthalate) matrices in which are dispersed nodules of polyamide-6,6 encapsulated by a copolymer of ethylene, of ethyl acrylate and of glycidyl methacrylate. A comparative example shows that, in a PA-6 matrix, the PA-6,6 nodules encapsulated by the ethylene copolymer are bigger than the nodules formed only of the ethylene copolymer.

Patent Application WO 97/46621 discloses polyamide mixtures which are provided in the form of a matrix in which are dispersed encapsulated nodules. It is explained that if, in a matrix (M) comprising nodules (S), a portion of (S) were replaced by a polymer (K), the tensile stress could be improved while retaining the flexural modulus. Furthermore, a reduction in size of the nodules of the phase dispersed in (M) also very often resulted therefrom.

The publication by M. Genas ("Rilsan PA11, synthesis and properties", Angew. Chemie, 74(15), 535–540, 1962) describes the use of phosphoric acid catalyst for accelerating the polycondensation of PA.

Likewise, the publications by M. K. Dobrokhotova et al. ("Synthesis of PA12", Plasticheskie Massy, 2, 23, 1979, and the subsequent publications by the same authors) describe the role of phosphoric acid: catalyst and chain-limiting agent.

SUMMARY OF THE INVENTION

It has now been found that polyamide compositions comprising catalysed polyamide exhibited the advantage of a notched Charpy impact strength at −40° C. (ISO 179/93) which increased with the intrinsic viscosity of the compositions, whereas polyamides comprising plasticizers and not comprising catalysed polyamide exhibited a low and constant impact strength (or an impact strength increasing in much lower proportions) as a function of the intrinsic viscosity (see table 1-2 and FIG. 1).

The compositions of the invention are manufactured by mixing the various constituents in the molten state (twin-screw, Buss or single-screw extruders) according to the usual techniques for thermoplastics. The compositions can be granulated for the purpose of a subsequent use (it is sufficient to remelt them) or else can be immediately injected into a mould or an extrusion or coextrusion device, in order to manufacture pipes or sections. The intrinsic viscosity of the compositions thus obtained is higher than that of the starting polyamides (A1) and (A2).

The intrinsic viscosity ($\eta$) is measured with an Ubbelhode viscometer at 25° C. in meta-cresol for 0.5 g of polymer in 100 ml of meta-cresol. This principle is described in Ullmann's Encyclopedia of Industrial Chemistry, Vol. A 20, p. 527–528 (1995, $5^{th}$ edition). In the continuation of the text, the intrinsic viscosity denotes the intrinsic viscosity normalized to the amount of polyamide, that is to say that it is the intrinsic viscosity of the composition *100/(%A1+%A2). It is therefore a matter of relating the measured value to the amount of PA present in the composition (it being possible for A1 and/or A2 themselves to be polyamide mixtures which are soluble in meta-cresol) by deducting the other constituents (flexible modifier, plasticizer, stabilizers, fillers, and the like). For example, the intrinsic viscosity of a composition comprising 70% of PA-12, 12% of catalysed PA-11, 10% of mEPR modifier and 8% of plasticizer is determined as being the ratio "measured viscosity"* 100%/(100%−10%−8%) or alternatively the ratio "measured viscosity"* 100%/(70%+12%).

Another advantage of the compositions of the present invention is the bursting stress of the manufactured pipes. This stress increases with the intrinsic viscosity of the compositions, whereas, for polyamides or polyamides comprising only plasticizer and not catalysed polyamide, the bursting pressure decreases when the intrinsic viscosity increases (see table 1-2 and FIG. 2).

Another advantage of the compositions of the present invention is the accuracy of the sizing of the pipes extruded during their processing. For example, as regards pipes with an external diameter of 8 mm and a thickness of 1 mm, the accuracy is improved by approximately 3 hundredths of an mm in comparison with compositions comprising only plasticizer and not catalysed polyamide (see table 1-2 and FIG. 3). This remarkable behaviour makes possible to increase the extrusion speed of the tubes, thus increasing productivity while keeping the same accuracy of the sizing of the pipes.

Another advantage of the compositions of the present invention is the excellent melt strength which is the holding of the melted compositions. They are particularly suited, not only for extrusion of pipes and profiles of standard sizes (example tube 8*1 mm or 12*1.5 mm), but for extrusion of large diameter pipes. They are particularly suited for blow extrusion of hollow bodies, even of large size. Thus the compositions exhibit a large spread of processing possibilities.

Another advantage of the compositions of the present invention is there is less trouble due to the exudation which is the plasticizer leaving the compositions with the temperature increase. In fact these compositions contain less plasticizer. Thus less problems of aspect (deposits) and dimensionnal variations (due to the release of plasticizer which could reach 10 to 30%) occur. The loss of plasticizer can create a decrease of the fittings' strength and variation of mechanical, physical and chemical properties. Under 7–8% of plasticizer the Tg of PA 11 and PA 12 is above ambient temperature. Due to the less molecular mobility, migration of plasticizer and polyamide oligomers (increased by presence of plasticizer) are reduced. It is very advantageous for pieces conveying fluids such as gasoline in which released oligomers can plug filtration systems.

Another advantage of the compositions of the present invention is the excellent resistance to abrasion.

Another advantage of the compositions of the present invention is the better inherent resistance to ageing, in particular in temperature, whichever in presence of air, water and other chemicals such as gasoline, alcohols and mixtures thereof (fluids of the automotive industry). The results are displayed in TABLE 3.

The invention will now be described in detail.

The term "polyamide" is understood to mean the condensation products:

of one or more amino acids, such as aminocaproic acid, 7-aminoheptanoic acid, 11-aminoundecanoic acid and 12-aminododecanoic acid, or of one or more lactams, such as caprolactam, oenantholactam and lauryllactam;

of one or more salts or mixtures of diamines, such as hexamethylenediamine, dodecamethylenediamine, meta-xylylenediamine, bis(p-aminocyclohexyl) methane and trimethylhexamethylenediamine, with diacids, such as isophthalic acid, terephthalic acid, adipic acid, azelaic acid, suberic acid, sebacic acid and dodecanedicarboxylic acid;

or of mixtures of some of these monomers which results in copolyamides, for example coPA-6/12, by condensation of caprolactam and lauryllactam, or for example coPA-12/11, by condensation of lauryllactam and aminoundecanoic acid.

The term "polyamide" is also understood to mean copolymers with polyamide blocks and polyether blocks and the mixtures of these copolymers with the preceding polyamides. Polymers with polyamide blocks and polyether blocks result from the copolycondensation of polyamide sequences comprising reactive ends with polyether sequences comprising reactive ends, such as, inter alia:

1) polyamide sequences comprising diamine chain ends with polyoxyalkylene sequences comprising dicarboxylic chain ends, 2) polyamide sequences comprising dicarboxylic chain ends with polyoxyalkylene sequences comprising diamine chain ends obtained by cyanoethylation and hydrogenation of α,ω-dihydroxylated aliphatic polyoxyalkylene sequences, known as polyetherdiols, 3) polyamide sequences comprising dicarboxylic chain ends with polyetherdiols, the products obtained being, in this specific case, polyetheresteramides.

Polyamide sequences comprising dicarboxylic chain ends originate, for example, from the condensation of α,ω-aminocarboxylic acids, of lactams or of dicarboxylic acids and diamines in the presence of a chain-limiting dicarboxylic acid. The polyamide blocks are advantageously made of polyamide-12.

The number-average molar mass of the polyamide sequences is between 300 and 15,000 and preferably between 600 and 5,000. The mass of the polyether sequences is between 100 and 6,000 and preferably between 200 and 3,000.

The polymers with polyamide blocks and polyether blocks can also comprise randomly distributed units. These polymers can be prepared by the simultaneous reaction of the polyether and of the precursors of the polyamide blocks.

For example, polyetherdiol, a lactam (or an α,ω-amino acid) and a chain-limiting diacid can be reacted in the presence of a small amount of water. A polymer is obtained which has essentially polyether blocks and polyamide blocks of very variable length but also the various reactants which have reacted randomly, which are statistically distributed along the polymer chain.

These polymers with polyamide blocks and polyether blocks, whether they originate from the copolycondensation of polyamide and polyether sequences prepared beforehand or from a one-stage reaction, exhibit, for example, Shore D hardnesses which can be between 20 and 75 and advantageously between 30 and 70 and an intrinsic viscosity between 0.8 and 2.5, measured in meta-cresol at 25° C.

Whether the polyester blocks derive from polyethylene glycol, polyoxypropylene glycol or polyoxytetramethylene glycol, they are either used as is and copolycondensed with polyamide blocks comprising carboxylic ends or they are aminated, in order to be converted into polyetherdiamines, and condensed with polyamide blocks comprising carboxylic ends. They can also be mixed with polyamide precursors and a chain-limiting agent in order to form polymers with polyamide blocks and polyether blocks having statistically distributed units.

Polymers with polyamide and polyether blocks are disclosed in U.S. Pat. Nos. 4,331,786, 4,115,475, 4,195,015, 4,839,441, 4,864,014, 4,230,838 and 4,332,920.

The polyether can be, for example, a polyethylene glycol (PEG), a polypropylene glycol (PPG) or a polytetramethylene glycol (PTMG). The latter is also known as polytetrahydrofuran (PTHF).

Whether the polyether blocks are introduced into the chain of the polymer with polyamide blocks and polyether blocks in the form of diols or of diamines, they are known for simplicity as PEG blocks or PPG blocks or PTMG blocks.

It would not be departing from the scope of the invention if the polyether blocks comprised different units, such as units derived from ethylene glycol, from propylene glycol or from tetramethylene glycol.

The polymer with polyamide blocks and polyether blocks is advantageously such that the polyamide is the major constituent by weight, that is to say that the amount of polyamide which is in the form of blocks and that which is optionally statistically distributed in the chain represents 50% by weight or more of the polymer with polyamide blocks and polyether blocks. The amount of polyamide and the amount of polyether are advantageously in the ratio (polyamide/polyether) 50/50 to 80/20.

The polyamide blocks and the polyether blocks of the same polymer (B) preferably have masses Mn of 1000/1000, 1300/650, 2000/1000, 2600/650 and 4000/1000 respectively.

As regards the polyamide (A1), the invention more particularly relates to polyamide-12 (polylauryllactam), polyamide-6,12 (polyhexamethylene dodecaneamide) polyamide-10,12 (polydecamethylene dodecaneamide), polyamide-10,10 (polydecamethylene sebacamide), copolyamide-12/11 (copolymer of lauryllactam and of aminoundecanoic acid) or copolyamide-6/12 (copolymer of caprolactam and of lauryllactam). The intrinsic viscosity of the polyamide (A1) which is used to prepare the compositions of the invention can be between 0.9 and 2.4.

As regards the polyamide (A2), this is a polyamide as described above but comprising a polycondensation catalyst, such as an inorganic or organic acid, for example phosphoric acid. The catalyst can be added to the polyamide (A2) after its preparation by any process or, very simply and preferably, can be the residue of the catalyst used for its preparation. "Catalysed polyamide" means that the chemistry will continue beyond the stages of synthesis of the base resin and therefore during the subsequent stages of the preparation of the compositions of the invention. Polymerization and/or depolymerization reactions will be able to take place to a very substantial extent during the mixing of the polyamides (A1) and (A2) to prepare the compositions of the present invention. Typically, it is believed (without being bound by this explanation) that polymerization continues (chain elongation) and branching of the chains continues (for example, bridging by means of phosphoric acid). Furthermore, this can be regarded as a tendency towards the reequilibration of the polymerization equilibrium and therefore a kind of homogenization. However, it is recommended to thoroughly dry (and advantageously to exert good control over the levels of moisture) the polyamides in order to avoid depolymerizations. The amount of catalyst can be between 5 ppm and 15,000 ppm of phosphoric acid with respect to the resin (A2). For other catalysts, for example boric acid, the contents will be different and can be appropriately chosen using the usual techniques for the polycondensation of polyamides.

It would not be departing from the scope of the invention if the polyamide A1 was a mixture of several polyamides and/or if polyamide A2 was also a mixture of several polyamides, at least one of them being catalysed.

In order to obtain compositions having a predetermined intrinsic viscosity, a person skilled in the art of polycondensation and of compounding can easily choose the starting polyamides. As a general rule, the intrinsic viscosity of a mixture of polyamides is proportional to the amount of each polyamide and to their intrinsic viscosities. In the present case, it is necessary to take into account the starting intrinsic viscosity of A2 and A1, the nature of A2 and A1, and the amount and the nature of the catalyst. In connection with the nature and the amount of the catalyst, it is also necessary to take into account the conditions for mixing A1 and A2, such as the water content, which can be adjusted, either beforehand (for example by drying) or during manufacture, by one or more systems for the controlled degassing of the mixing device (for example, a degassing port over an extruder). This water content is a well known parameter in the preparation of polyamides which displaces the equilibrium towards polymerization when the amount of water decreases and towards depolymerization when the water content increases. The proportions of A1 and of A2 are also chosen according to the mechanical properties asked of the compositions of the invention, such as, for example, flexural modulus. For example, starting with a mixture of 76% of PA-12, with an intrinsic viscosity of 1.63, and of 24% of PA-11, with an intrinsic viscosity of 1.33 and comprising 3700 ppm of phosphoric acid, this mixture being compounded at 270° C. with a screw speed of 300 revolutions/min and under an absolute pressure of 160 mm Hg, an intrinsic viscosity of 1.60 is obtained. If the same mixture is produced but under an absolute pressure of 760 mm Hg, an intrinsic viscosity of 1.40 is obtained.

The invention is of particular use for compositions having a flexural modulus of the order of 150 to 700 MPa, measured according to ISO Standard 178. The compositions of the present invention advantageously comprise a plasticizer and/or a flexible modifier.

Mention may be made, as examples of plasticizer, of butylbenzenesulphonamide (BBSA), ethylhexyl para-hydroxybenzoate (EHPB) and decylhexyl para-hydroxybenzoate (DHPB). It would not be departing from the scope of the invention to use a mixture of several plasticizers.

The flexible modifier can be a polyolefin chain having polyamide grafts or polyamide oligomers; thus, it has affinities with polyolefins and polyamides.

The flexible modifier can also be an ethylene copolymer having maleic anhydride units; thus, it has affinities with polyethylenes and can react with polyamides.

Mention may be made, as examples of flexible modifier, of functionalized polyolefins, grafted aliphatic polyesters, polymers with polyether blocks and polyamide blocks which are optionally grafted, or copolymers of ethylene and of an alkyl (meth)acrylate and/or of a saturated carboxylic acid vinyl ester. The copolymers with polyether blocks and polyamide blocks can be chosen from those which have been mentioned above as polyamide. They can be used as polyamides A1 and A2 and also as flexible modifier. In the latter case, the choice is rather made of flexible copolymers, that is to say having a flexural modulus of between 10 and 200 MPa.

The flexible modifier can also be a block copolymer having at least one block compatible with (A1) and at least one block compatible with (A2).

The functionalized polyolefin is a polymer comprising α-olefin units and epoxide or carboxylic acid or carboxylic acid anhydride units.

Mention may be made, as examples, of polyolefins or SBS, SIS, SEBS, EPR (also known as EPM) or EPDM block polymers grafted with unsaturated epoxides, such as glycidyl (meth)acrylate, or with carboxylic acids, such as (meth)acrylic acid, or with unsaturated carboxylic acid anhydrides, such as maleic anhydride. EPR denotes ethylene-polypropylene elastomers and EPDM ethylene-polypropylene-diene elastomers. The term "polyolefin" is understood to mean a polymer comprising olefin units, such as, for example, ethylene, propylene, 1-butene or any other α-olefin units. Mention may be made, as examples, of:

polyethylenes, such as LDPE, HDPE, LLDPE or VLDPE, polypropylene, ethylene/propylene copolymers or metallocene PEs;

copolymers of ethylene with at least one product chosen from the salts or esters of unsaturated carboxylic acids or the vinyl esters of saturated carboxylic acids.

The polyolefin is advantageously chosen from LLDPE, VLDPE, polypropylene, ethylene/vinyl acetate copolymers or ethylene/alkyl (meth)acrylate copolymers. The relative density can advantageously be between 0.86 and 0.965 and the melt flow index (MFI) can be between 0.3 and 40.

Mention may also be made, as examples of flexible modifier, of:

copolymers of ethylene, of an unsaturated epoxide and optionally of an unsaturated carboxylic acid ester or salt or of a saturated carboxylic acid vinyl ester. These are, for example, ethylene/vinyl acetate/glycidyl (meth) acrylate copolymers or ethylene/alkyl (meth)acrylate/glycidyl (meth)acrylate copolymers.

copolymers of ethylene, of an unsaturated carboxylic acid anhydride and/or of an unsaturated carboxylic acid, which can be partially neutralized by a metal (Zn) or an alkali metal (Li), and optionally of an unsaturated carboxylic acid ester or of a saturated carboxylic acid vinyl ester. These are, for example, ethylene/vinyl acetate/maleic anhydride copolymers or ethylene/alkyl (meth)acrylate/maleic anhydride copolymers or ethylene/Zn or Li (meth)acrylate/maleic anhydride copolymers.

polyethylene, polypropylene or ethylene/propylene copolymers which are grafted or copolymerized with an unsaturated carboxylic acid anhydride and then condensed with a monoamino polyamide (or polyamide oligomer). These products are disclosed in EP 342,066.

The functionalized polyolefin is advantageously chosen from ethylene/alkyl (meth)acrylate/maleic anhydride copolymers, ethylene/vinyl acetate/maleic anhydride copolymers or ethylene/propylene copolymers, predominantly of propylene, which are grafted with maleic anhydride and then condensed with monoamino polyamide-6 or monoamino oligomers of caprolactam.

It is preferably an ethylene/alkyl (meth)acrylate/maleic anhydride copolymer comprising up to 40% by weight of alkyl (meth)acrylate and up to 10% by weight of maleic anhydride. The alkyl (meth)acrylate can be chosen from methyl acrylate, ethyl acrylate, n-butyl acrylate, isobutyl acrylate, 2-ethylhexyl acrylate, cyclohexyl acrylate, methyl methacrylate and ethyl methacrylate.

Mention may be made, for example, as grafted aliphatic polyesters, of polycaprolactone grafted with maleic anhydride, glycidyl methacrylate, vinyl esters or styrene. These products are disclosed in Application EP 711,791, the contents of which are incorporated in the present application.

Advantageous compositions comprise 6% to 36% of catalysed polyamide (A2), 2% to 8% of plasticizer, 0 to 20% of flexible modifier and the remainder polyamide (A1). The flexible modifier is advantageously chosen from ethylene-polypropylene (EPR and EPDM) copolymers grafted with maleic anhydride, ethylene-alkyl (meth)acrylate-maleic anhydride copolymers, the latter copolymers mixed with copolymers of ethylene and of an alkyl (meth)acrylate, or ethylene-alkyl (meth)acrylate-maleic anhydride copolymers mixed with (i) ethylene-alkyl (meth)acrylate-glycidyl methacrylate copolymers and (ii) ethylene-alkyl (meth)acrylate-acrylic acid copolymers, the latter three being crosslinked. These ethylene-alkyl (meth)acrylate-maleic anhydride, ethylene-alkyl (meth)acrylate-glycidyl methacrylate and ethylene-alkyl (meth)acrylate-acrylic acid copolymers can comprise up to 40% by weight of acrylates and 10% by weight either of anhydride or of epoxide or of acid. The MFI (melt flow index) is between 2 and 50 g/10 min, measured at 190° C. under 2.16 kg.

The flexible modifier advantageously has a flexural modulus of less than 200 MPa and preferably of between 10 and 200.

It would not be departing from the scope of the invention to use a mixture of several flexible modifiers or to use a flexible modifier as mentioned above as a mixture with another polymer, such as those described as flexible modifier but not having an epoxide, acid or carboxylic acid anhydride functional group.

The compositions according to the invention can additionally comprise at least one additive chosen from:

dyes;

pigments;

optical brighteners;

antioxidants;

UV stabilizers.

EXAMPLES

The following products were used:

PA-12: a polyamide-12 with an Mw of 45,000 to 55,000.

Catalysed PA-11: a polyamide-11 with an Mw of 45,000 to 55,000.

Lotader™: an ethylene/butyl acrylate/maleic anhydride copolymer with proportions by weight of 81/18/1, with an MFI at 190° C. under 2.16 kg of between 3 and 10, which is a statistical copolymer obtained by high-pressure radical catalysis.

Lotader AX™: an ethylene-methyl acrylate-glycidyl methacrylate copolymer with proportions by weight of 66/24/10, with an MFI at 190° C. under 2.16 kg of between 3 and 10.

Lotryl™: an ethylene/butyl acrylate copolymer with proportions by weight of 70/30 and with an MFI at 190° C. under 2.16 kg of between 0.1 and 0.5.

mEPR: a maleicized ethylene-polypropylene copolymer (Exxelo™ VA 1801, supplied by Exxon).

Lucalen™: an ethylene-butyl acrylate-acrylic acid copolymer with proportions by weight of 88/8/4, with an MFI at 190° C. under 2.16 kg of between 0.1 and 0.5.

The plasticizer used is BBSA.

The bursting pressure is measured according to DIN 73378 and expressed in MPa.

The notched Charpy impact at −40° C. (ISO 179/93) is expressed in kJ/m$^2$.

The flexural modulus (ISO 178) is in MPa.

The extrudability is the accuracy of the sizing (or the tolerance) over the external diameter of an 8 mm pipe with a thickness of 1 mm and is expressed in +/− hundredths of an mm, this being when the product is processed.

The ageing is expressed in hours and is the time where the elongation at break is reduced by 50%; it is measured on samples 2 mm thickness for air and on tubes for diesel.

In the examples, the catalyst for PA-11 is $H_3PO_4$ in an amount of 0.4% by weight based on the amount of the polyamide, the plasticizer is BBSA and the impact modifier is Lotader, except when otherwise indicated in the tables. (In the tabulated examples, the flexural modifier is recited as "impact modifier" or "modifier".) In the examples, the amounts are by weight, and the amount of PA-12 is 100% minus the percentages of impact modifier, PA-11 and plasticizer.

The impact strength, the bursting and the extrudability are represented in FIGS. 1, 2 and 3 from the values in the tables. The comparisons are based on compositions of same flexibility because flexibility (and viscosity) are the characteristics of a family of compositions.

Aside from phosphoric acid, other condensation catalysts include, for example, derivatives thereof and all acid containing phosphorus compounds such as hypophosphoric acid and derivatives thereof. Condensation catalysts are further described in the technical patent and scientific literature, for example: Polyamide, Kunststoff Handbuch 3/4, Published by Hanser, 1998, München (Munich, Germany).

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French application 99/03.814, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A flexible pipe comprising a thermoplastic composition comprising by weight:

50 to 99% of a polyamide (A1) not containing a condensation catalyst and having an intrinsic viscosity between 0.9 and 2.4, 1 to 50% of a catalyzed polyamide (A2) containing a condensation catalyst, 0 to 40% of a plasticizer, 0 to 60%, of a flexible modifier having a flexible modulus of less than 200 MPa, the total being 100%.

2. The flexible pipe according to claim 1, in which (A1) is polyamide-12 and (A2) is polyamide-11.

3. The flexible pipe according to claim 2, in which the catalyst in the polyamide (A2) is phosphoric acid.

4. The flexible pipe according to claim 3, comprising 6 to 36% of catalyzed polyamide (A2), 3 to 8% of plasticizer, 0 to 20% of flexible modifier and the remainder polyamide (A1).

5. The flexible pipe according to claim 2, comprising 6 to 36% of catalyzed polyamide (A2), 3 to 8% of plasticizer, 0 to 20% of flexible modifier and the remainder polyamide (A1).

6. The flexible pipe according to claim 5, comprising 6 to 36% of catalyzed polyamide (A2), 3 to 8% of plasticizer, 0 to 20% of flexible modifier and the remainder polyamide (A1).

7. The flexible pipe according to claim 1, in which the catalyst in the polyamide (A2) is phosphoric acid.

8. The flexible pipe according to claim 7, comprising 6 to 36% of catalyzed polyamide (A2), 3 to 8% of plasticizer, 0 to 20% of flexible modifier and the remainder polyamide (A1).

9. The flexible pipe according to claim 1, comprising above 0% of said flexible modifier in which the flexible modifier is chosen from ethylene-propylene copolymers grafted with maleic anhydride, ethylene-alkyl (meth)acrylate-maleic anhydride copolymers, the latter copolymers mixed with copolymers of ethylene and of an alkyl (meth)acrylate, or ethylene-alkyl (meth)acrylate-maleic anhydride copolymers mixed with (i) ethylene-alkyl (meth)acrylate-glycidyl methacrylate copolymers and (ii) ethylene-alkyl (meth)acrylate-acrylic acid copolymers, the latter three being crosslinked.

10. The flexible pipe according to claim 9, in which the catalyst in the polyamide (A2) is phosphoric acid.

11. The flexible pipe according to claim 1, comprising 6 to 36% of catalyzed polyamide (A2), 3 to 8% of plasticizer, 0 to 20% of flexible modifier and the remainder polyamide (A1).

12. The flexible pipe according to claim 9, in which (A1) is polyamide-12 and (A2) is polyamide-11.

13. The flexible pipe according to claim 12, in which the catalyst in the polyamide (A2) is phosphoric acid.

14. The flexible pipe according to claim 13, comprising 6 to 36% of catalyzed polyamide (A2), 3 to 8% of plasticizer, 0 to 20% of flexible modifier and the remainder polyamide (A1).

15. The flexible pipe according to claim 9, comprising 6 to 36% of catalyzed polyamide (A2), 3 to 8% of plasticizer, not more than 20% of flexible modifier and the remainder polyamide (A1).

16. The flexible pipe according to claim 12, comprising 6 to 36% of catalyzed polyamide (A2), 3 to 8% of plasticizer, 0 to 20% of flexible modifier and the remainder polyamide (A1).

17. The flexible pipe according to claim 1, comprising 6 to 36% of catalyzed polyamide (A2), 3 to 8% of plasticizer, 0 to 20% of flexible modifier and the remainder polyamide (A1).

18. The flexible pipe according to claim 1, wherein the polyamides of said thermoplastic pipe consist essentially of said polyamides.

* * * * *